US012694503B2

(12) United States Patent
Fenger et al.

(10) Patent No.: US 12,694,503 B2
(45) Date of Patent: Jul. 28, 2026

(54) CONTOUR EXTRACTION OF IMAGES WITH SELECTION-BASED AUTO TUNING

(71) Applicant: Siemens industry software inc., Plano, TX (US)

(72) Inventors: Germain Louis Fenger, Gladstone, OR (US); Hsin-Wei Wu, Heverlee (BE); Kiarash Ahi, San Jose, CA (US)

(73) Assignee: Siemens Industry Software Inc., Plano, TX (US)

( * ) Notice: Subject to any disclaimer, the term of this patent is extended or adjusted under 35 U.S.C. 154(b) by 307 days.

(21) Appl. No.: 18/476,559

(22) Filed: Sep. 28, 2023

(65) Prior Publication Data

US 2025/0111494 A1 Apr. 3, 2025

(51) Int. Cl.
*G06T 7/00* (2017.01)
*G06T 7/11* (2017.01)
(Continued)

(52) U.S. Cl.
CPC .............. *G06T 7/0008* (2013.01); *G06T 7/11* (2017.01); *G06T 7/194* (2017.01); *G06V 10/46* (2022.01);
(Continued)

(58) Field of Classification Search
CPC ......... G06T 7/0008; G06T 7/11; G06T 7/194; G06T 2207/10061; G06T 2207/30148; G06T 7/0004; G06T 2207/10056; G06T 7/13; G06T 7/10; G06T 7/12; G06V 10/46; G06V 10/764; G06V 2201/06; G06V 10/44; G06F 18/24; G01B 2210/56
See application file for complete search history.

(56) References Cited

U.S. PATENT DOCUMENTS

2002/0113613 A1* 8/2002 Laureanti ........... G01R 31/2831
324/750.22
2013/0236085 A1* 9/2013 Chen ..................... G06T 7/0004
382/145

(Continued)

FOREIGN PATENT DOCUMENTS

CN 114387232 A * 4/2022 ............... G06T 7/73

OTHER PUBLICATIONS

English Translation: CN-114387232-A (Year: 2022).*

*Primary Examiner* — Sumati Lefkowitz
*Assistant Examiner* — Aaron Joseph Sorrin

(57) ABSTRACT

A computing system can obtain wafer images of integrated circuitry having physical structures and classify each of the wafer images based on image characteristics of the wafer images. The computing system can partition each of the wafer images into a plurality of blocks, analyze each of the blocks to determine which of the blocks correspond to a background portion or a contour portion of the wafer images, assign an image score to each wafer image based on the analysis of each of the blocks, and classify the wafer images based on the image scores assigned to the wafer images. The computing system can set parameters for contour extraction using at least one of the wafer images selected from each of the classifications of the wafer images, and extract contours corresponding to the physical structures of the integrated circuitry from the wafer images based, at least in part, on the parameters.

14 Claims, 5 Drawing Sheets

WAFER IMAGE 510

PARTITIONED WAFER IMAGE 520

(51) Int. Cl.
    *G06T 7/194*       (2017.01)
    *G06V 10/46*       (2022.01)
    *G06V 10/764*     (2022.01)

(52) U.S. Cl.
    CPC .. *G06V 10/764* (2022.01); *G06T 2207/10061*
            (2013.01); *G06T 2207/30148* (2013.01)

(56)           References Cited

U.S. PATENT DOCUMENTS

| | | | |
|---|---|---|---|
| 2020/0349713 A1* | 11/2020 | Adiga | G06T 7/60 |
| 2023/0185187 A1* | 6/2023 | Hamouda | G06T 7/64 |
| | | | 716/51 |
| 2024/0202908 A1* | 6/2024 | Rundo | G06V 20/70 |

* cited by examiner

WAFER IMAGE 510

PARTITIONED
WAFER IMAGE 520

WAFER IMAGE WITH
BACKGROUND BLOCKS 530

WAFER IMAGE WITH
CONTOUR BLOCKS 540

CONTOUR EXTRACTION OF IMAGES WITH SELECTION-BASED AUTO TUNING

TECHNICAL FIELD

This application is generally related to electronic design automation and, more specifically, to contour extraction of integrated circuit images with selection-based auto tune.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Descriptions for physical designs of integrated circuits can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask is created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process to manufacture the integrated circuits described in the physical designs.

After manufacture, wafer images of the integrated circuit can be captured, for example, using a scanning electron microscope (SEM). These wafer images are often analyzed, for example, to gather measurements or metrology data, identify manufacturing variations, calibrate other electronic design automation tools, such as optical proximity correction (OPC) calibration, or the like. One common type of analysis, called contour extraction, designers utilize a contour extraction tool to identify shapes or contours in the SEM images that correspond to physical structures of the manufactured integrated circuit. In order for the contour extraction tool to work effectively, many designers tune parameters of the contour extraction tool according to the SEM images that the contour extraction tool intends to process. Some designers can utilize an auto-tuning functionality, such as a machine-learning algorithm, to analyze the SEM images and set the parameters for the contour extraction tool. While this auto-tuning functionality can allow the contour extraction tool to effectively extract contours from the SEM images, the time and processing resources consumed to analyze a large set of wafer images in order to set the parameters can be onerous.

SUMMARY

This application discloses a computing system implementing a contour extraction system to obtain wafer images of integrated circuitry having physical structures and classify each of the wafer images based on image characteristics of the wafer images. In some embodiments, the computing system implementing the contour extraction system can partition each of the wafer images into a plurality of blocks, analyze each of the blocks to determine which of the blocks correspond to a background portion or a contour portion of the wafer images, assign an image score to each wafer image based on the analysis of each of the blocks, and classify the wafer images based on the image scores assigned to the wafer images. The computing system implementing the contour extraction system can set parameters for contour extraction using at least one of the wafer images selected from each of the classifications of the wafer images, and extract contours corresponding to the physical structures of the integrated circuitry from the wafer images based, at least in part, on the parameters. Embodiments of will be described below in greater detail.

DETAILED DESCRIPTION

Illustrative Operating Environment

Figure 1:
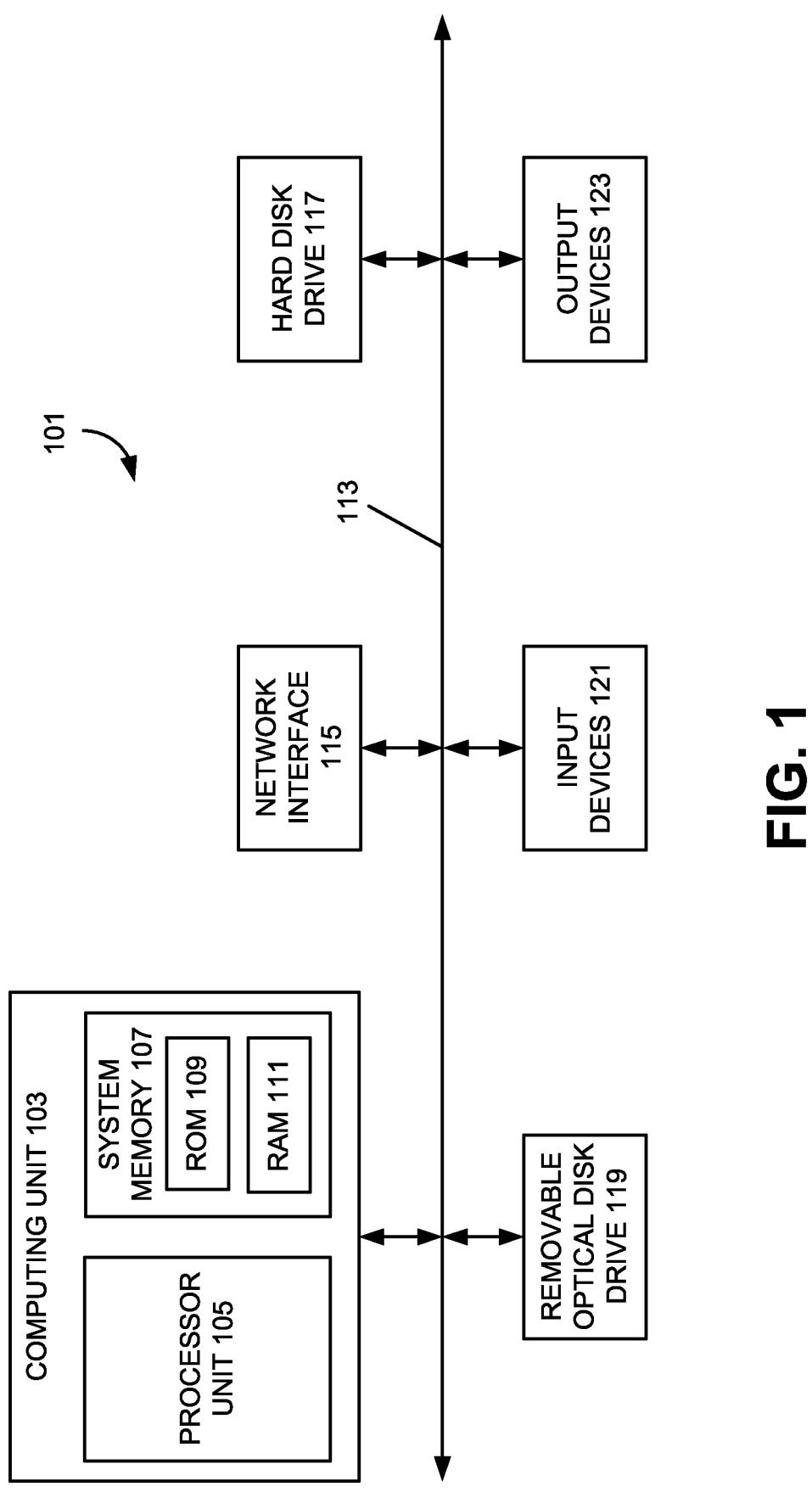
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
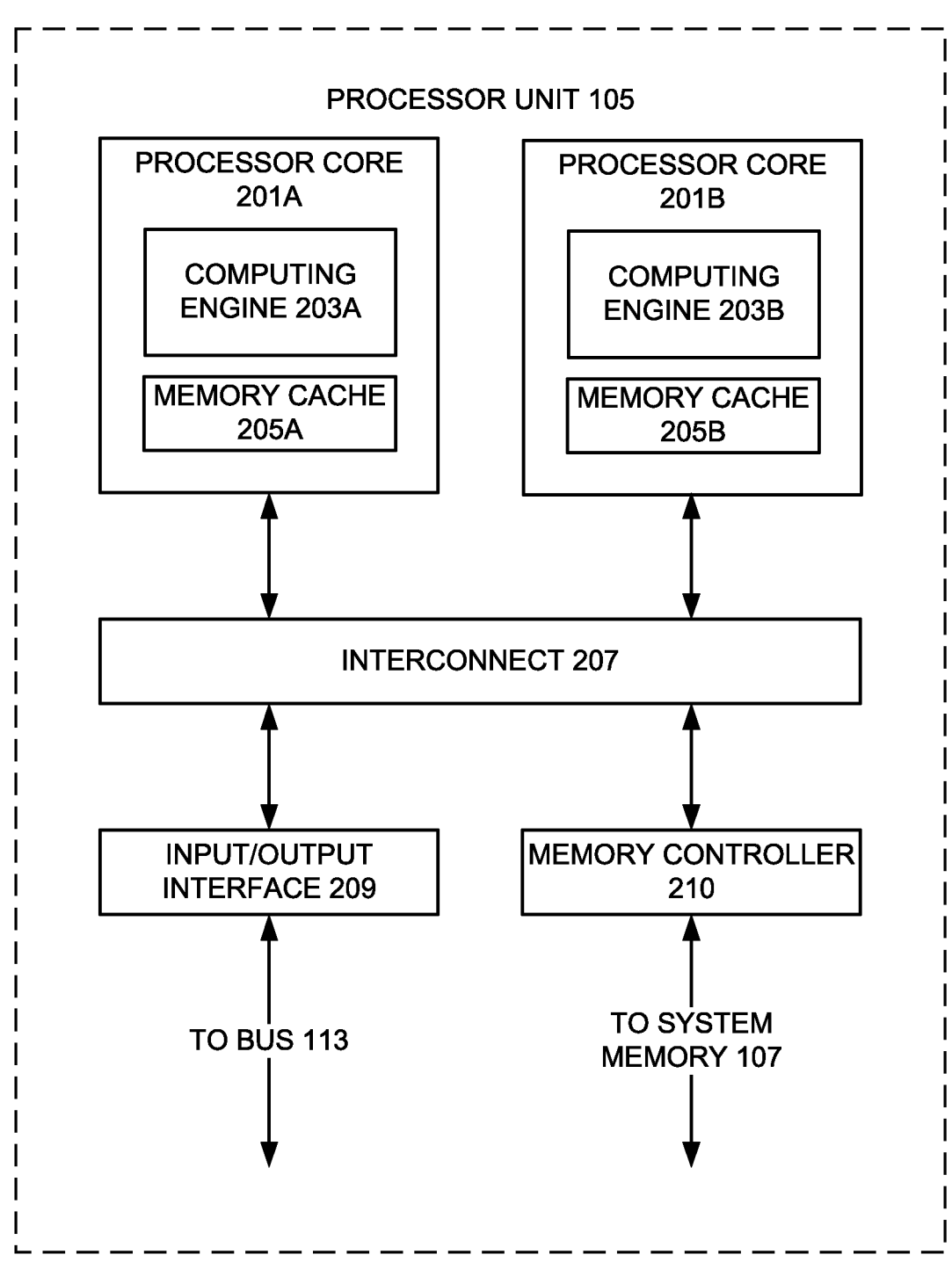

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Contour Extraction of Images with Selection-Based Auto Tuning

Figure 3:
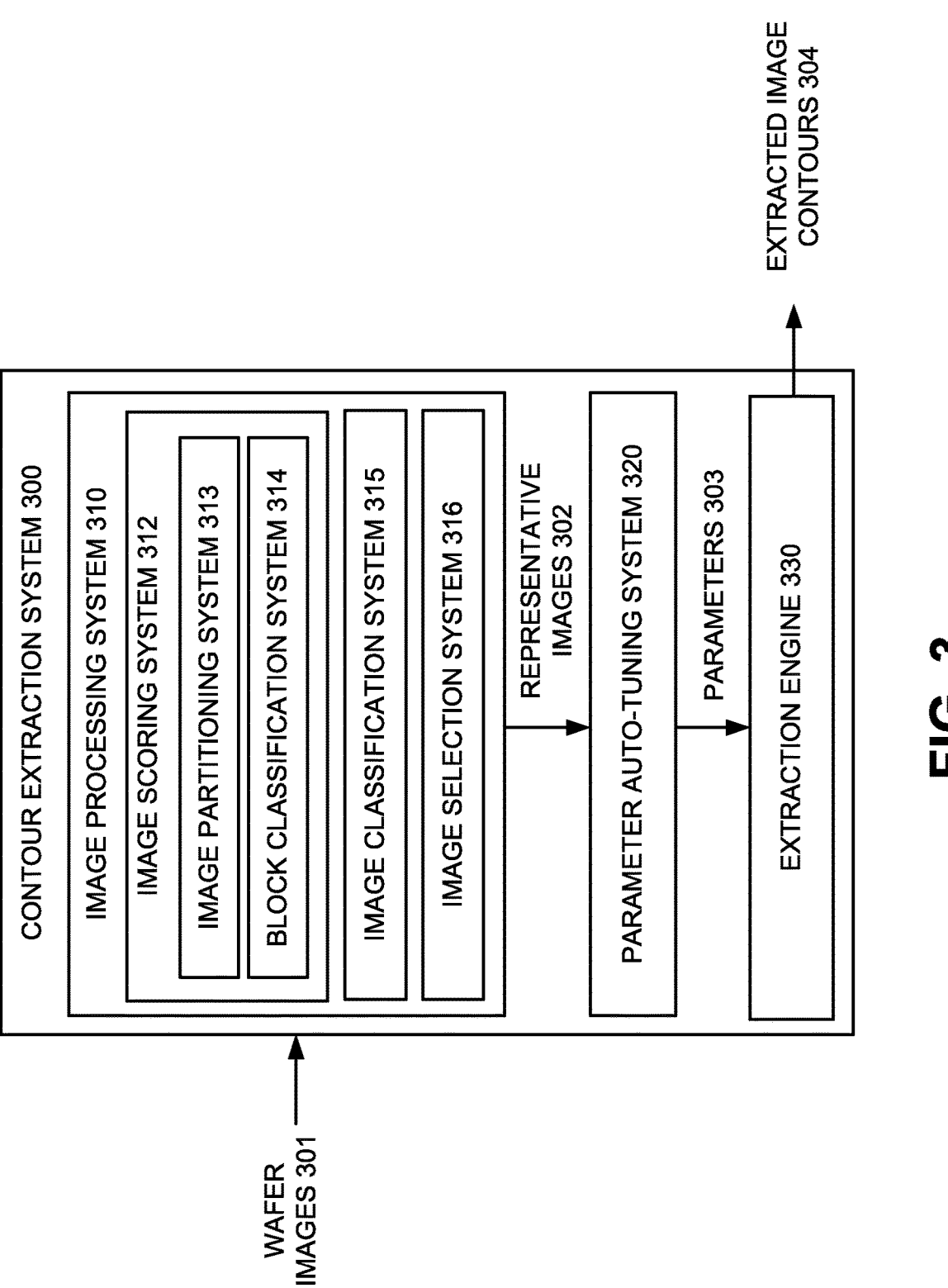
FIG. 3 illustrates an example contour extraction system with selection-based auto-tuning that may be implemented according to various embodiments.
Figure 4:
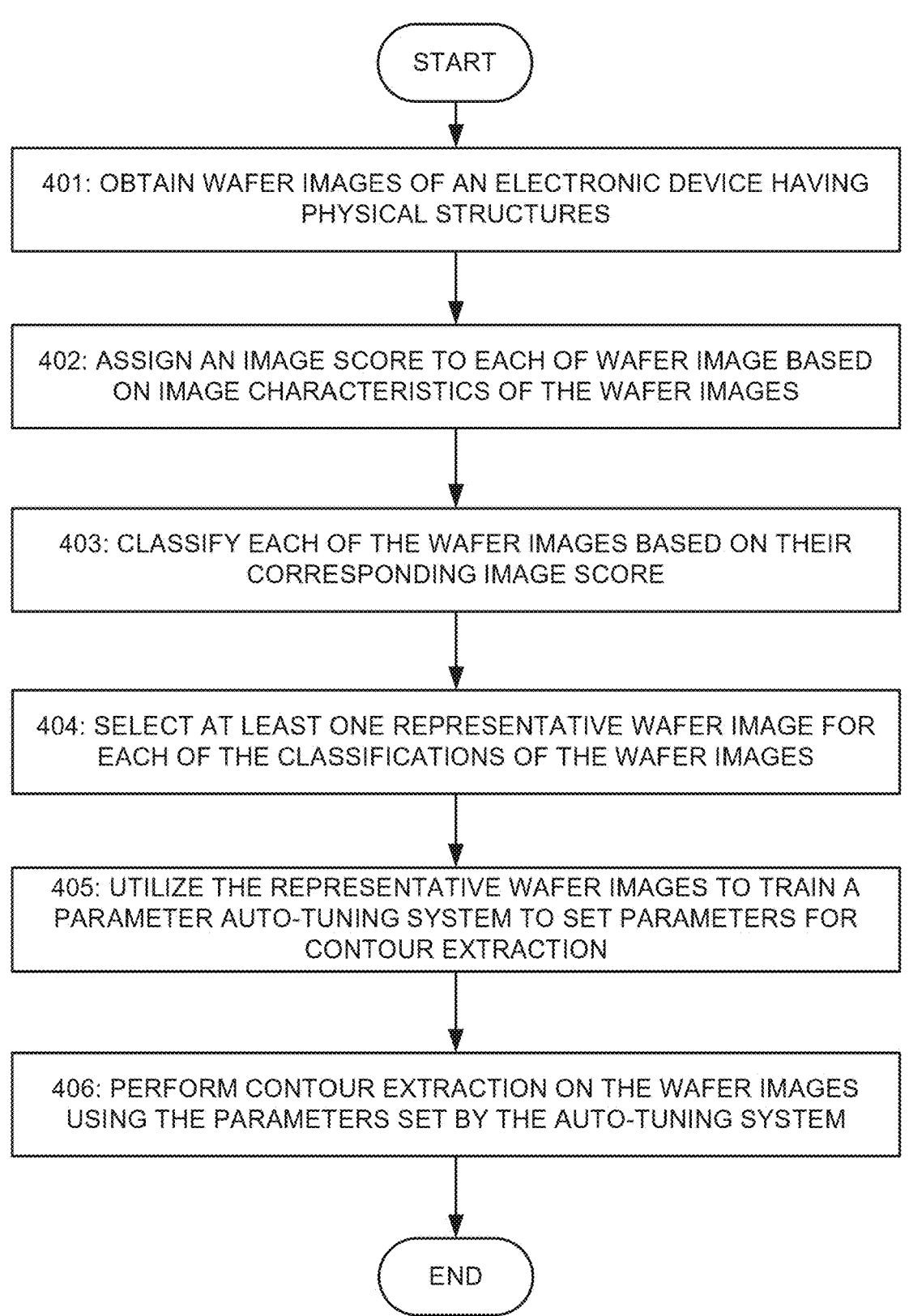
FIG. 4 illustrates a flowchart showing an example implementation of contour extraction with selection-based auto-tuning according to various examples.

FIG. 3 illustrates an example contour extraction system with selection-based auto-tuning that may be implemented according to various embodiments. FIG. 4 illustrates a flowchart showing an example implementation of contour extraction with selection-based auto-tuning according to various examples. Referring to FIGS. 3 and 4, the contour extraction system 300, for example, implemented using the computing device 101 described with reference to FIG. 1, can, in a block 401 of FIG. 4, obtain wafer images 301 of an electronic device, such as an integrated circuit, having physical structures, for example, manufactured using one or more lithographic masks associated with a layout design describing the electronic device. In some embodiments, the wafer images 301 can include an image generated by a scanning electron microscope (SEM) system that can be utilized to collect measurements during optical lithographic experiments for different features on a wafer, for example, performed by a foundry at a manufacturing process node.

The contour extraction system 300 can identify contours in the wafer image 301 that correspond to the manufactured physical structures of the electronic device, extract the identified contours from the wafer images 301, and output extracted image contours 304. In some embodiments, the extracted image contours 304 can be utilized to gather measurements or metrology data associated with the manufactured electronic device, identify manufacturing variations in the electronic device, calibrate other electronic design automation tools, such as optical proximity correction (OPC) calibration, or the like.

The contour extraction tool 300 can include an image processing system 310 to analyze the wafer images 301 based on their image characteristics and select a plurality of the wafer images 301 as representative images 302. In some embodiments, the representative images 302 can be a subset of the wafer images 301 that can have image characteristics representative of the wafer images 301.

The image processing system 310 can include an image scoring system 312 that, in a block 402 of FIG. 4, can assign an image score to each of the wafer images 301 or portions thereof based on the image characteristics of the wafer images 301. The image scoring system 312 can analyze the image characteristics of the wafer images 301 or portions thereof, for example, identifying variance or deviation of pixel values, to determine the image scores of the wafer images 301 or portions of the wafer images 301. In some embodiments, the image scoring system 312 can subdivide the wafer images 301 into blocks, classify the blocks as corresponding to background portions and contour portions of the wafer images 301, and generate the image scores for each of the wafer images 301 based on the classifications of the blocks. Embodiments of assigning image scores to wafer images 301 or portions thereof will be described below in greater detail with reference to FIGS. 5A-5D.

Figure 5A:
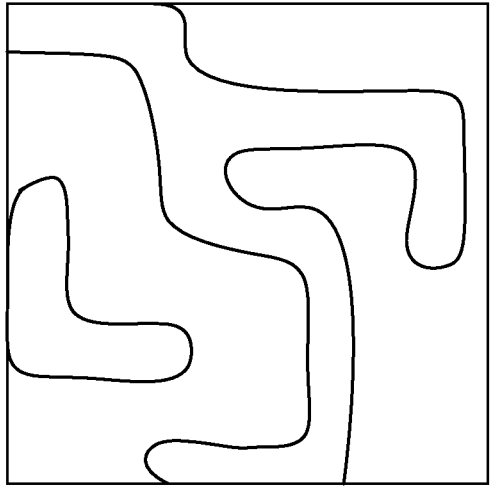
FIGS. 5A-5D illustrates example wafer image partitioning and block classification according to various examples.
Figure 5B:
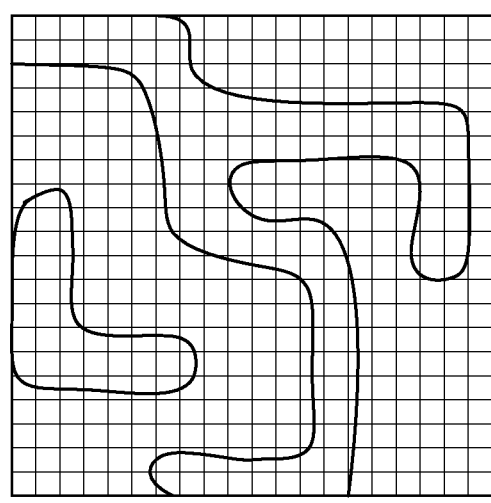

FIGS. 5A-5D illustrates example wafer image partitioning and block classification according to various examples. Referring to FIG. 5A, a wafer image 501 of an electronic device, such as an integrated circuit, has physical structures, for example, manufactured using one or more lithographic masks associated with a layout design describing the electronic device. The physical structures shown in the wafer image 501 can have edges defining their shape, which appear as contours in the wafer image 501. The non-contour portions of the wafer image 501 can correspond to background regions of the wafer image 501, as they do not include information defining the shape of the physical structures in the manufactured electronic device.

Referring to FIGS. 3 and 5B-5D, the image scoring system 312 can include an image partitioning system 313 to sub-divide or partition the wafer image 501 into a partitioned wafer image 520. In some embodiments, the image partitioning system 313 can sub-divide the wafer image 501 into equal sized blocks, for example, as shown in the partitioned wafer image 520 of FIG. 5B. In other embodiments, the image partitioning system 313 can sub-divide the wafer image 501 with differing sized blocks, for example, selected or determined based on the underlying image characteristics of the wafer image 501.

Figure 5C:
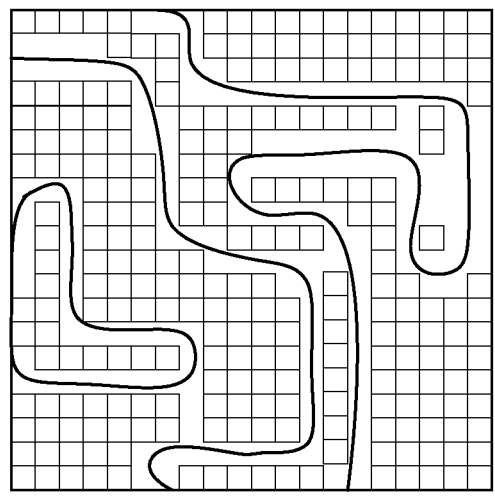
Figure 5D:
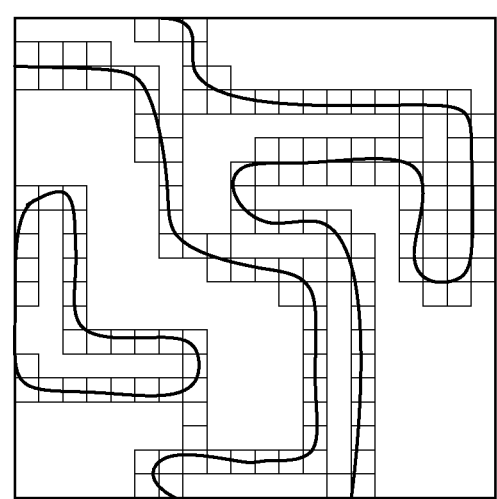

The image scoring system 312 can include a block classification system 314 to analyze each of blocks in the partitioned wafer image 520 to determine whether the pixel data within the blocks of the wafer image 501 correspond to a background portion of the wafer image 501 or a contour portion of the wafer image 501. In some embodiments, the block classification system 314 can identify a variance of the pixel data within each of the blocks, for example, by calculating a standard deviation of the pixel values in each of the blocks, and then classify the blocks as corresponding to a background portion of the wafer image 501 or a contour portion of the wafer image 501 based on the identified variances. In some embodiments, the block classification system 314 can compare the identified variances of the pixel values within the blocks against a deviation threshold. When the block classification system 314 determines the variance of pixel values within a block exceeds the deviation threshold, meaning the block includes pixel values with variance associated with a contour, the block classification system 314 can classify the block as a contour block. When the block classification system 314 determines the variance of pixel values within a block fall below the deviation threshold, meaning the block includes pixel values with variance associated with a background portion of the wafer image 301, the block classification system 314 can classify the block as a background block. FIG. 5C shows a wafer image with background blocks 530, which has the wafer image 510 along with those blocks in the partitioned wafer image 520 that correspond to blocks classified as background blocks. FIG. 5D shows a wafer image with contour blocks 540, which has the wafer image 510 along with those blocks in the partitioned wafer image 520 that correspond to blocks classified as contour blocks.

Referring back to FIGS. 3 and 4, the image processing system 310 can include an image classification system 315 that, in a block 403 of FIG. 4, can classify each of the wafer images 301 based on their corresponding image score. In some embodiments, the image classification system 315 can bin the wafer images 301 together into different groups based on their corresponding image scores, and classify the wafer images 301 according to their respective bins. Each group of the wafer images 301 in the bins can have similar image scores and thus similar image characteristics within the wafer images 301. The image classification system 315, in some embodiments, create a histogram of the respective bins and their corresponding wafer images 301, which the image processing system 310 can utilize to set the variance threshold used to classify the blocks of the wafer images 301 as background blocks or contour blocks.

The image processing system 310 can include an image selection system 316 that, in a block 404 of FIG. 4, can select at least one wafer image representative for each of the classifications of the wafer images 301. In some embodiments, the image selection system 316 can select at least one of the wafer images 301 in each of the bins and then aggregate the selected wafer images 301 into the representative images 302. The image selection system 316 can select the wafer images 301 within the bins randomly, based on their image score, such as a wafer image having a median or average image score in the bin, a most common image score in the bin, or the like.

The contour extraction tool 300 can include a parameter auto-tuning system 320 that, in a block 405, can utilize the representative images 302 to train a parameter auto-tuning system to set parameters 303 for contour extraction. The parameters 303 for contour extraction can include parameters to indicate a number of pixels in the wafer images 301 to utilize to identify contours, to indicate a pixel value deviation to annunciate a contour, or the like. In some embodiments, the parameter auto-tuning system 320 can include a machine-learning algorithm that, after being trained by the representative images 302, can set the parameters 303 for contour extraction. By reducing the volume of training images from the entire set of the wafer images 301 down to the representative images 302 using the image characteristics of the wafer images 301, the parameter auto-tuning system 320 can speed-up the training of the machine-learning algorithm without trading-off accuracy of the parameters 303.

The contour extraction tool 300 can include an extraction engine 330 that, in a block 406 of FIG. 4, can extract image contours corresponding to the physical structures of the electronic device from the wafer images 301 of the electronic device using the parameters 303. The extraction engine 330 can output the extracted image contours 304, which can be utilized to gather measurements or metrology data associated with the manufactured electronic device, identify manufacturing variations in the electronic device, calibrate other electronic design automation tools, such as optical proximity correction (OPC) calibration, or the like.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:

obtaining, by a computing system, wafer images of integrated circuitry having physical structures;

classifying, by the computing system, each of the wafer images into bins based on image characteristics of the wafer images;

selecting, by the computing system, at least one of the wafer images from each of the bins;

aggregating, by the computing system, the selected wafer images into representative images, which correspond to training data for a machine-learning algorithm implemented by the computing system;

setting, by the machine-learning algorithm implemented by the computing system, parameters for contour extraction using the representative images; and extracting, by the computing system, contours corresponding to the physical structures of the integrated circuitry from the wafer images based, at least in part, on the parameters.

2. The method of claim 1, wherein classifying each of the wafer images based on the image characteristics of the wafer images further comprises:

partitioning each of the wafer images into a plurality of blocks;

analyzing each of the blocks to determine which of the blocks correspond to a background portion of the corresponding wafer image and which of the blocks correspond to a contour portion of the corresponding wafer image; and assigning an image score to each wafer image based on the analysis of each of the blocks, wherein the classifying each of the wafer images is based on the image scores assigned to the wafer images.

3. The method of claim 2, wherein analyzing each of the blocks to determine whether the blocks correspond to the background portion of the corresponding wafer images or the contour portion of the corresponding wafer images further comprises:

calculating a standard deviation of the pixels of the wafer images within each of the blocks; and determining whether the blocks correspond to the background portion of the corresponding wafer image or the contour portion of the wafer image based on the standard deviation relative to a threshold deviation value.

4. The method of claim 2, wherein the classifying each of the wafer images into bins further comprises binning the wafer images into different groups based on the image scores of the corresponding wafer images.

5. The method of claim 1, wherein the wafer images correspond to scanning electron microscope (SEM) images of manufactured integrated circuitry.

6. A system comprising:

a memory system configured to store computer-executable instructions; and a computing system, in response to execution of the computer-executable instructions, is configured to:

obtain wafer images of integrated circuitry having physical structures;

classify each of the wafer images based on image characteristics of the wafer images;

select at least one of the wafer images from each of the bins;

aggregate the selected wafer images into representative images, which correspond to training data for a machine-learning algorithm implemented by the computing system;

set, by the machine-learning algorithm implemented by the computing system, parameters for contour extraction using the representative images; and extract contours corresponding to the physical structures of the integrated circuitry from the wafer images based, at least in part, on the parameters.

7. The system of claim 6, wherein the computing system, in response to execution of the computer-executable instructions, is further configured to classify each of the wafer images based on the image characteristics of the wafer images by:

partitioning each of the wafer images into a plurality of blocks;

analyzing each of the blocks to determine which of the blocks correspond to a background portion of the corresponding wafer image and which of the blocks correspond to a contour portion of the corresponding wafer image; and assigning an image score to each wafer image based on the analysis of each of the blocks, wherein the classifying each of the wafer images is based on the image scores assigned to the wafer images.

8. The system of claim 7, wherein the computing system, in response to execution of the computer-executable instructions, is further configured to analyze each of the blocks to determine whether the blocks correspond to the background portion of the corresponding wafer images or the contour portion of the corresponding wafer images by:

calculating a standard deviation of the pixels of the wafer images within each of the blocks; and determining whether the blocks correspond to the background portion of the corresponding wafer image or the contour portion of the wafer image based on the standard deviation relative to a threshold deviation value.

9. The system of claim 7, wherein the computing system, in response to execution of the computer-executable instructions, is further configured to classify each of the wafer images into bins by binning the wafer images into different groups based on the image scores of the corresponding wafer images.

10. An apparatus comprising at least one computer-readable memory device storing instructions configured to cause one or more processing devices to perform operations comprising:

obtaining wafer images of integrated circuitry having physical structures;

classifying each of the wafer images based on image characteristics of the wafer images;

selecting at least one of the wafer images from each of the bins;

aggregating the selected wafer images into representative images, which correspond to training data for a machine-learning algorithm implemented by the computing system;

setting, by the machine-learning algorithm implemented by the one or more processing devices, parameters for contour extraction using the representative images; and extracting contours corresponding to the physical structures of the integrated circuitry from the wafer images based, at least in part, on the parameters.

11. The apparatus of claim 10, wherein classifying each of the wafer images based on the image characteristics of the wafer images further comprises:

partitioning each of the wafer images into a plurality of blocks;

analyzing each of the blocks to determine which of the blocks correspond to a background portion of the corresponding wafer image and which of the blocks correspond to a contour portion of the corresponding wafer image; and assigning an image score to each wafer image based on the analysis of each of the blocks, wherein the classifying each of the wafer images is based on the image scores assigned to the wafer images.

12. The apparatus of claim 11, wherein analyzing each of the blocks to determine whether the blocks correspond to the background portion of the corresponding wafer images or the contour portion of the corresponding wafer images further comprises:

calculating a standard deviation of the pixels of the wafer images within each of the blocks; and determining whether the blocks correspond to the background portion of the corresponding wafer image or the contour portion of the wafer image based on the standard deviation relative to a threshold deviation value.

13. The apparatus of claim 11, wherein the classifying each of the wafer images into bins further comprises binning the wafer images into different groups based on the image scores of the corresponding wafer images.

14. The apparatus of claim 10, wherein the wafer images correspond to scanning electron microscope (SEM) images of manufactured integrated circuitry.

\* \* \* \* \*